US012606777B2

(12) United States Patent
Vockenroth et al.

(10) Patent No.: US 12,606,777 B2
(45) Date of Patent: Apr. 21, 2026

(54) FLOWABLE DETERGENT PREPARATION COMPRISING A FATTY ACID AND TERNARY SOLVENT MIXTURE

(71) Applicant: Henkel AG & Co. KGaA, Duesseldorf (DE)

(72) Inventors: Inga Kerstin Vockenroth, Duesseldorf (DE); Nuria Sanchez Bastardo, Essen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 352 days.

(21) Appl. No.: 18/174,113

(22) Filed: Feb. 24, 2023

(65) Prior Publication Data

US 2023/0265361 A1 Aug. 24, 2023

(30) Foreign Application Priority Data

Feb. 24, 2022 (DE) ......................... 102022201910.5

(51) Int. Cl.
*C11D 7/26* (2006.01)
*C11D 17/00* (2006.01)

(52) U.S. Cl.
CPC .......... *C11D 7/261* (2013.01); *C11D 17/0008* (2013.01); *C11D 2111/12* (2024.01)

(58) Field of Classification Search
CPC . C11D 17/042; C11D 17/043; C11D 2111/12; C11D 1/83; C11D 3/2006; C11D 3/2041; C11D 3/2065; C11D 7/50; C11D 7/5004; C11D 7/5077; C11D 3/30; C11D 7/3218; C11D 1/04
See application file for complete search history.

(56) References Cited

U.S. PATENT DOCUMENTS

| | | | | |
|---|---|---|---|---|
| 5,776,882 | A * | 7/1998 | Vasudevan | C11D 3/3765 510/423 |
| 5,925,608 | A | 7/1999 | Spruyt et al. | |
| 10,934,254 | B2 | 3/2021 | Piorkowski et al. | |
| 2004/0068051 | A1* | 4/2004 | Ortiz | C11D 3/3769 525/54.1 |
| 2015/0030643 | A1* | 1/2015 | Gartstein | C11D 3/3742 106/287.11 |
| 2015/0353869 | A1* | 12/2015 | Stenger | C11D 17/042 510/276 |
| 2016/0213598 | A1* | 7/2016 | Oh | A61Q 13/00 |
| 2017/0137745 | A1* | 5/2017 | Tang | C11D 1/29 |
| 2019/0127665 | A1* | 5/2019 | Beier | C11D 3/30 |
| 2019/0169535 | A1* | 6/2019 | Piorkowski | C11D 1/831 |
| 2020/0291330 | A1 | 9/2020 | Vejborg et al. | |
| 2022/0154108 | A1* | 5/2022 | Ludolph | C08G 73/024 |

FOREIGN PATENT DOCUMENTS

| | | | |
|---|---|---|---|
| CN | 106350268 | A | 1/2017 |
| CN | 109554237 | A | 4/2019 |
| CN | 111607471 | A | 9/2020 |

OTHER PUBLICATIONS

European Patent Office, European Research Report, EP 23151653, Jun. 30, 2023, pp. 1-8, European Patent Office, Munich, Germany.
German Search Report 10 2022 201 910.5 Mail Date: Aug. 12, 2022; Completion Date: Aug. 12, 2022 6 Pages.

* cited by examiner

*Primary Examiner* — Charles I Boyer
(74) *Attorney, Agent, or Firm* — Bojuan Deng

(57) ABSTRACT

A flowable detergent preparation containing, based on the total weight thereof, a) ethanol and 1,2-propanediol and glycerol in a total amount of 5 to 25 wt. %; wherein the weight ratio of ethanol and 1,2-propanediol to glycerol is 0.9 to 5.0, and washing method using this detergent preparation.

20 Claims, No Drawings

FLOWABLE DETERGENT PREPARATION COMPRISING A FATTY ACID AND TERNARY SOLVENT MIXTURE

FIELD OF THE INVENTION

The present invention relates to a flowable detergent preparation based on a specific solvent system. Furthermore, the application relates to a method for washing textiles using the detergent preparation.

BACKGROUND OF THE INVENTION

Continuously changing requirements are imposed on the forms of manufacture and supply of detergents and cleaning agents. The main focus has, for quite some time, been on the convenient metering of detergents and cleaning agents by the consumer and the simplification of the work steps necessary for carrying out a washing or cleaning method. A technical solution is provided by pre-portioned detergents or cleaning agents, for example film pouches comprising one or more receiving chambers for solid or liquid detergents or cleaning agents.

A trend relevant to the production of these film pouches is the miniaturization of these film pouches. The background of this development is higher consumer acceptance due to simplified handling, in particular sustainability aspects, for example in relation to transport volumes and costs and the quantity of packaging materials used.

The concentration of modern detergents, in particular modern liquid detergents, generally influences their optical and rheological properties and also affects the storage stability of these agents, in particular in the case of storage under stress conditions, that is to say lower than average or above-average temperatures. A lack of physical storage stability is visible for the consumer as clouding, precipitation or phase separation, and reduces the confidence in the product effect. One way of counteracting physical instabilities consists in increasing the solvent fraction of the liquid detergent, in particular also in increasing the proportion of organic solvents. Since such a procedure is diametrically opposed to the actual aim of the concentration, it is not preferred.

BRIEF SUMMARY OF THE INVENTION

The object of the application was to provide high-performance flowable detergent preparations which can be produced in a simple and efficient manner, have a good storage life, and are characterized in particular by good cleaning results.

DETAILED DESCRIPTION OF THE INVENTION

A first subject of the application is a flowable detergent preparation containing, based on the total weight thereof, a) ethanol and 1,2-propanediol and glycerol in a total amount of 5 to 25 wt. %;

wherein the weight ratio of ethanol and 1,2-propanediol to glycerol is 0.9 to 5.0.

The detergent preparation is flowable under standard conditions (20° C., 1013 mbar).

Surprisingly, when ethanol and 1,2-propanediol and glycerol are used, a weight ratio of ethanol and 1,2-propanediol to glycerol of 0.9 to 5.0 has proven advantageous for the product optics, in particular the transparency and phase stability of the flowable detergent preparation.

Detergent preparations which contain, based on their total weight, ethanol and 1,2-propanediol and glycerol in a total amount of 10 to 22 wt. %, preferably of 15 to 20 wt. %, have proven to be particularly advantageous.

The weight ratio of ethanol and 1,2-propanediol to glycerol of 1.5 to 3.5 is preferably from 2 to 3.

In addition to the three solvents mentioned, the detergent preparation can contain further organic solvents. Preferably, said further organic solvents include, for example, n-propanol, i-propanol, butanols, glycol, butanediol, methylpropanediol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butylether, di-n-octylether. The organic amines, such as the monoethanolamine, used for the neutralization of anionic surfactants optionally contained in the detergent preparation, are not included in the group of organic solvents.

Since it has been found that advantageous product optics can be achieved solely by adding the three organic solvents ethanol, 1,2-propanediol and glycerol, on account of their lower formulation complexity detergent preparations are preferred which, in addition to ethanol, 1,2-propanediol and glycerol, contain less than 2 wt. %, preferably less than 1 wt. %, and in particular no, further organic solvents.

In addition to the organic solvents, water is preferably used as a further solvent. The use of aqueous-organic solvent systems has proven to be particularly advantageous for the producibility and storage life, and is therefore preferred.

Preferred detergent preparations contain, based on their total weight, 5 to 20 wt. %, preferably 7 to 15 wt. %, water.

Preferred detergent preparations contain, based on their total weight, 35 to 55 wt. %, preferably 40 to 50 wt. %, surfactant.

The group of surfactants includes the non-ionic, anionic, cationic and amphoteric surfactants. The compositions according to the invention can comprise one or more of the surfactants mentioned. Particularly preferred compositions contain surfactant from the group of anionic and non-ionic surfactants.

The anionic surfactant is preferably selected from the group comprising $C_9$-$C_{13}$ alkylbenzene sulfonates, olefin sulfonates, $C_{12}$-$C_{18}$ alkane sulfonates, ester sulfonates, alk(en)yl sulfates, fatty alcohol ether sulfates and mixtures thereof. Compositions which comprise $C_9$-$C_{13}$ alkylbenzene sulfonates and fatty alcohol ether sulfates as the anionic surfactant have particularly good dispersing properties. In this case, preferably $C_9$-$C_{13}$ alkylbenzene sulfonates, olefin sulfonates, i.e. mixtures of alkene and hydroxyalkane sulfonates, and disulfonates, as obtained, for example, from $C_{12}$-$C_{18}$ monoolefins having a terminal or internal double bond by way of sulfonation with gaseous sulfur trioxide and subsequent alkaline or acid hydrolysis of the sulfonation products, are possible as surfactants of the sulfonate type. $C_{12}$-$C_{18}$ alkane sulfonates and the esters of $\alpha$-sulfo fatty acids (ester sulfonates) are also suitable, for example the $\alpha$-sulfonated methyl esters of hydrogenated coconut, palm kernel or tallow fatty acids.

Preferred detergent preparations contain, based on their total weight, 12 to 30 wt. %, preferably 15 to 28 wt. %, and in particular 18 to 26 wt. % anionic surfactant.

It is very particularly preferred for the composition to contain at least one anionic surfactant of formula (I),

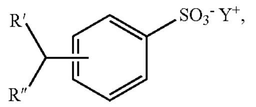

(I)

where

R' and R" are, independently of one another, H or alkyl, and together contain 8 to 18, preferably 9 to 15 and in particular 9 to 13, C atoms, and $Y^+$ denotes a monovalent cation or the nth part of an n-valent cation (in particular monoethanolamine).

The group of the alkyl ether sulfates include the fatty alcohol ether sulfates, such as the sulfuric acid monoesters of straight-chain or branched $C_7$-$C_{21}$ alcohols ethoxylated with 1 to 6 mol ethylene oxide, such as 2-methyl-branched C9-11 alcohols having, on average, 3.5 mol ethylene oxide (EO) or C12-18 fatty alcohols having 1 to 4 EO. Alkyl ether sulfates of formula (II) are preferred $$R^1\text{—O-(AO)}_n\text{—}SO_3^-X^+ \quad (II)$$

In this formula (II), $R^1$ is a linear or branched, substituted or unsubstituted alkyl functional group, preferably a linear, unsubstituted alkyl functional group, particularly preferably a fatty alcohol functional group. Preferred $R^1$ functional groups of formula (II) are selected from decyl, undecyl, dodecyl, tridecyl, tetradecyl, pentadecyl, hexadecyl, heptadecyl, octadecyl, nonadecyl, eicosyl functional groups and the mixtures thereof, the representatives having an even number of C atoms being preferred. Particularly preferred functional groups $R^1$ of formula (II) are derived from fatty alcohols having 12 to 18 C atoms, for example from coconut fatty alcohol, tallow fatty alcohol, lauryl alcohol, myristyl alcohol, cetyl alcohol or stearyl alcohol, or from oxo alcohols having 10 to 20 C atoms.

AO in formula (II) represents an ethylene oxide (EO) or propylene oxide (PO) group, preferably an ethylene oxide group. The index n in formula (I) is an integer from 1 to 50, preferably from 1 to 20, and in particular from 2 to 10. Very particularly preferably, n is 2, 3, 4, 5, 6, 7 or 8. X is a monovalent cation or the nth part of an n-valent cation, the alkali metal ions, including $Na^+$ or $K^+$, being preferred in this case, with $Na^+$ being most preferred. Further cations X+ may be selected from $NH_4^+$, ½ $Zn^{2+}$, ½ $Mg^{2+}$, ½ $Ca^{2+}$, ½ $Mn^{2+}$ and the mixtures thereof, as well as primary and secondary amines, in particular monoethanolamine.

Particularly preferred compositions contain an alkyl ether sulfate selected from fatty alcohol ether sulfates of formula (III)

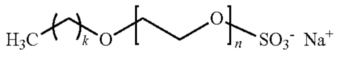

(III)

where k=11 to 19, and n=2, 3, 4, 5, 6, 7 or 8. Very particularly preferred representatives are Na fatty alcohol ether sulfates having 12 to 18 C atoms and 2 EO (k=11 to 13, n=2 in formula III). The degree of ethoxylation indicated represents a statistical average that can correspond to an integer or a fractional number for a specific product. The degrees of alkoxylation indicated represent statistical averages which can be an integer or a fractional number for a specific product. Preferred alkoxylates/ethoxylates have a narrowed homolog distribution (narrow range ethoxylates, NRE).

In summary, preferred detergent preparations contain, based on their total weight, 12 to 30 wt. %, preferably 15 to 28 wt. %, and in particular 18 to 26 wt. %, anionic surfactant from the group of the $C_{8-18}$-alkylbenzenesulfonates and alkyl ether sulfates, preferably from the group of the $C_{8-18}$-alkylbenzenesulfonates.

The use of fatty acids has proven advantageous for stability and cleaning performance. Preferred detergent preparations therefore contain, based on their total weight, 4 to 12 wt. %, preferably 6 to 10 wt. %, fatty acid. Particularly preferred fatty acids are selected from the group of caprylic acid, capric acid, lauric acid, myristic acid, palmitic acid, stearic acid, oleic acid, linoleic acid and mixtures thereof. In the context of the application, the fatty acids are not assigned to the group of anionic surfactants.

The detergent preparations contain non-ionic surfactant as a further preferred optional component. Their proportion by weight of the total weight of the detergent preparation is 12 to 30 wt. %, preferably 15 to 28 wt. %, and in particular 18 to 26 wt. %.

In particular the use of non-ionic surfactants from the group of alkyl ethoxylates is preferred, preferably alkyl ethoxylates from the group of the ethoxylated primary C8-18 alcohols, preferably the ethoxylated primary $C_{8-18}$ alcohols having a degree of alkoxylation ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, in particular the $C_{12-18}$ fatty alcohols having 7 EO or the $C_{13-15}$ oxo alcohols having 7 EO, being selected.

In summary, preferred detergent preparations contain non-ionic surfactants from the group of the ethoxylated primary $C_{8-18}$ alcohols, preferably the ethoxylated primary $C_{8-18}$ alcohols having a degree of alkoxylation ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, in particular the $C_{12-18}$ fatty alcohols having 7 EO or the $C_{13-15}$ oxo alcohols having 7 EO.

With regard to the rheological properties of the detergent preparation, the processability and cleaning effect thereof, it has proven advantageous to use non-ionic surfactant and anionic surfactant in a weight ratio of from 2:1 to 1:2, preferably from 3:2 to 2:3.

Due to their improved cleaning effect, detergent preparations are preferred which, as a further optional component, contain 0.2 to 5 wt. %, preferably 0.5 to 4 wt. %, enzyme preparation.

In addition to the actual enzyme protein, an enzyme preparation comprises further components such as enzyme stabilizers, carrier materials or fillers. In this case, the enzyme protein typically forms only a fraction of the total weight of the enzyme preparation. Enzyme preparations which are preferably used contain between 0.1 and 40 wt. %, preferably between 0.2 and 30 wt. %, more preferably between 0.4 and 20 wt. %, and most preferably between 0.8 and 10 wt. % of the enzyme protein. In such compositions, an enzyme stabilizer can be contained in an amount of 0.05 to 35 wt. %, preferably 0.05 to 10 wt. %, based on the total weight in the enzyme composition.

The protein concentration can be determined using known methods, for example the BCA method (bicinchoninic acid; 2,2'-bichinolyl-4,4'-dicarboxylic acid) or the Biuret method. The active protein concentration is determined in this regard via titration of the active centers using a suitable irreversible inhibitor (for proteases, for example, phenylmethylsulfonylfluoride (PMSF)), and determination of the residual activity.

It is preferred if the detergent preparation contains at least one enzyme preparation, preferably at least 3 enzyme preparations of enzymes from the group of lipase, amylase, protease, cellulase, preparations of a pectinolytic enzyme and endoglucanase.

According to the invention, it is preferred if the detergent preparation contains at least one lipase preparation. Lipases preferred according to the invention are selected from at least one enzyme of the group which is formed from triacylglycerol lipase (E.C. 3.1.1.3), and lipoprotein lipase (E.C. 3.1.1.34) and monoglyceride lipase (E.C. 3.1.1.23).

Preferred lipase preparations according to the invention are the commercial products marketed by Amano Pharmaceuticals under the names Lipase M-AP10®, Lipase LE® and Lipase F® (also Lipase JV®). For example, Lipase F® is naturally present in *Rhizopus oryzae*. Lipase M-AP10®, for example, is naturally present in *Mucor javanicus*.

A highly preferred lipase is commercially available from Novozymes (Denmark) under the trade name Lipex® and can advantageously be used in the detergent preparations according to the invention. The lipase Lipex® 100 L is particularly preferred here.

Preferred detergent preparations are characterized in that they contain, based on the total weight thereof, 0.01 to 1 wt. %, in particular 0.05 to 0.3 wt. %, lipase preparation.

The detergent preparations preferably contain at least one amylase, in particular an α-amylase. α-amylases (EC 3.2.1.1) hydrolyze, as enzymes, internal α-1,4-glycosidic bonds of starch and starch-like polymers. By way of example, α-amylases from *Bacillus licheniformis*, from *B. amyloliquefaciens* and from *B. stearothermophilus*, as well as the developments thereof that have been improved for use in detergents or cleaning agents, may be mentioned. The enzyme from *B. licheniformis* is available from the company Novozymes under the trade name Termamyl® and from the company Genencor under the trade name Purastar® ST. Development products of this α-amylase are available from Novozymes under the trade names Duramyl® and Termamyl® ultra, from Genencor under the name Purastar® OxAm, and from Daiwa Seiko Inc., Tokyo, Japan, as Keistase®. The α-amylase from *B. amyloliquefaciens* is marketed by Novozymes under the name BAN®, and derived variants of the α-amylase from *B. stearothermophilus* are marketed under the names BSG® and Novamyl®, also by Novozymes. Examples for α-amylases from other organisms are the developments of α-amylase from *Aspergillus niger* and *A. oryzae* that are available under the trade name Fungamyl® from Novozymes.

The proportion by weight of the amylase preparation, in particular the amylase preparation, with respect to the total weight of the detergent preparation is preferably 0.1 to 2 wt. %, in particular 0.2 to 1 wt. %.

It is preferred according to the invention if at least one protease is contained in the detergent preparation as the enzyme. A protease is an enzyme that cleaves peptide bonds by hydrolysis. Each of the enzymes from class E.C. 3.4 comes under this, according to the invention (comprising each of the thirteen subclasses which come under this). According to the invention, "protease activity" is present if the enzyme has proteolytic activity (EC 3.4). Different types of protease activity are known: The three main types are: trypsin-like, where the amide substrate is cleaved following the amino acids Arg or Lys at P1; chymotrypsin-like, where cleavage takes place following one of the hydrophobic amino acids at P1; and elastase-like, where the amide substrate is cleaved following Ala at P1.

Surprisingly, it was found that a protease of the type of alkaline protease from *Bacillus lentus* DSM 5483 or a protease sufficiently similar to this (based on the sequence identity) which has a plurality of these changes in combination is particularly suitable for use in the liquid detergent preparation according to the invention and advantageously stabilizes in an improved manner therein. Advantages of using this protease thus arise in particular with regard to wash performance and/or stability.

Very particularly preferably, the detergent preparation according to the invention contains protease of the alkaline protease type from *Bacillus lentus* DSM 5483 or a protease which is sufficiently similar to this (based on the sequence identity) and has a plurality of these modifications in combination.

The proportion by weight of the protease preparation with respect to the total weight of the detergent preparation is preferably 0.2 to 3 wt. %, in particular 0.4 to 2 wt. %.

Preferred detergent preparations contain as an optional component, based on their total weight, from 0.05 to 2 wt. %, preferably from 0.1 to 0.4 wt. %, of a preparation of a pectinolytic enzyme.

In the context of the present invention, the pectinolytic enzymes include enzymes having the names pectinase, pectate lyase, pectin esterase, pectin demethoxylase, pectin methoxylase, pectin methylesterase, pectase, pectin methylesterase, pectinesterase, pectin pectyl hydrolase, pectin depolymerase, endopolygalacturonase, pectolase, pectin hydrolase, pectin polygalacturonase, 20 endopolygalacturonase, poly-α-1,4-galacturonide, glycanohydrolase, endogalacturonase, endo-D-galacturonase, galacturan 1,4-α-galacturonidase, exopolygalacturonase, poly(galacturonate) hydrolase, exo-D-galacturonase, exo-D-galacturonanase, exopoly-D-galacturonase, exo-poly-α-galacturonosidase, exopolygalacturonosidase, or 25 exopolygalacturanosidase. The use of pectin lyases is very particularly preferred here.

Within the EC classification of enzymes, the numerical classification system for enzymes, the pectinolytic enzymes belong in particular to the enzyme classes ("Enzyme Commission number") EC 3.1.1.11, EC 3.2.1.15, EC 3.2.1.67 and EC 3.2.1.82 and consequently belong to the third of the six main enzyme classes, the 10 hydrolases (EC 3. hereunder to the glycosylases (EC 3.2.-.-) and again hereunder to the glycosidases (EC 3.2.1.-), i.e., enzymes that hydrolyze O- and/or S-glycosyl compounds. Consequently, pectinolytic enzymes act in particular against residues on dishes which contain pectic acid and/or other galacturonans, and catalyze the hydrolysis thereof.

In the context of the invention, pectate lyases are enzymes which catalyze the non-hydrolytic cleavage of pectate according to an endo mechanism.

Examples of suitable pectinolytic enzymes are the enzymes and enzyme preparations available under the trade names Gamanase®, Pektinex AR®, X-Pect® or Pectaway® from Novozymes, under the trade names Rohapect UF®, Rohapect TPL®, Rohapect PTE100®, Rohapect MPE®, 30 Rohapect MA plus HC, Rohapect DA12L®, Rohapect 10L®, Rohapect B1L® from AB Enzymes, and under the trade name Pyrolase® from Diversa Corp., San Diego, CA, USA.

As a preferred component, the detergent preparation contains 0.01 to 1 wt. %, preferably 0.02 to 0.3 wt. %, of a mannanase preparation.

A mannanase catalyzes the hydrolysis of 1,4-beta-D-mannosidic bonds in mannans, galactomannans, glucomannans and galactoglucomannans. Said mannanases according to the invention are classified according to the enzyme nomenclature as EC 3.2.1.78.

The xantanases and mannanases characterizing the subject matter of the claims are preferably components of a more comprehensive enzyme system. In a preferred embodiment, due to their improved cleaning performance the detergent preparation therefore additionally contains, based on the total weight thereof, 2 to 8 wt. %, preferably 3 to 6 wt. %, enzyme preparation, in addition to the xanthanase and mannanase preparation.

As a further preferred optional component, the detergent preparations contain a cellulase preparation. Synonymous terms can be used for cellulases, in particular endoglucanase, endo-1,4-beta-glucanase, carboxymethyl cellulase, endo-1,4-beta-D-glucanase, beta-1,4-glucanase, beta-1,4-endoglucanhydrolase, celludextrinase or avicelase. Within the meaning of the invention, whether or not an enzyme is a cellulase is decided by its ability to hydrolyze 1,4-β-D-glucosidic bonds in cellulose.

Cellulases (endoglucanases, EG) suitable according to the invention include, for example, fungal compositions rich in endoglucanase (EG), which are provided by the company Novozymes under the trade name Celluzyme®. The products Endolase® and Carezyme®, also available from Novozymes, are based on 50 kD-EG and 43 kD-EG, respectively, from Humicola insolens DSM 1800. Further commercial products from this company that can be used are Cellusoft®, Renozyme®, and Celluclean®. It is also possible to use cellulases, for example, which are available from AB Enzymes, Finland, under the trade names Ecostone® and Biotouch®, and which are, at least in part, based on 20 kD-EG from Melanocarpus. Further cellulases from AB Enzymes are Econase® and Ecopulp®. Further suitable cellulases are from *Bacillus* sp. CBS 670.93 and CBS 669.93, the cellulase from *Bacillus* sp.CBS 670.93 being available from Danisco/Genencor under the trade name Puradax®. Other commercial products from Danisco/Genencor that can be used are "Genencor detergent cellulase L" and IndiAge® Neutra.

The proportion by weight of the cellulase preparation with respect to the total weight of the detergent preparation is preferably 0.01 to 1 wt. %, in particular 0.05 to 0.3 wt. %.

The detergent preparation contains a phosphonate as a preferred optional component.

The proportion by weight of phosphonate with respect to the total weight of the detergent preparation is preferably 0.1 to 3 wt. % and in particular 0.2 to 1 wt. %.

A phosphonate from the group of the hydroxyalkane phosphonates and/or aminoalkane phosphonates, preferably from the group of aminoalkane phosphonates, and in particular from the group of ethylenediamine tetramethylene phosphonate (EDTMP) and diethylenetriamine pentamethylene phosphonate (DTPMP), in particular from the group diethylenetriamine pentamethylene phosphonate (DTPMP), is preferably selected as the phosphonate compound.

As an additional preferred component, the detergent preparation contains a polyalkoxylated polyalkyleneimine which is obtainable by reacting polyalkyleneimines with alkylene oxides. Due to their cleaning performance, particularly preferred detergent preparations contain, based on their total weight, 0.5 to 10 wt. %, preferably 2 to 8 wt. %, polyalkoxylated polyalkyleneimine.

The polyalkoxylated polyalkyleneimine is a polymer having a polyalkyleneimine backbone which carries polyalkoxy groups on the N atoms. It preferably has a weight-average molecular weight Mw in the range from 5000 g/mol to 60000 g/mol, in particular from 10000 g/mol to 22500 g/mol. The polyalkyleneimine has primary amino functions at the ends and preferably both secondary and tertiary amino functions in the interior, and optionally it can also have only secondary amino functions in the interior, such that the result is not a branched-chain but a linear polyalkyleneimine. The ratio of primary to secondary amino groups in the polyalkyleneimine is preferably in the range from 1:0.5 to 1:1.5, in particular in the range from 1:0.7 to 1:1. The ratio of primary to tertiary amino groups in the polyalkyleneimine is preferably in the range from 1:0.2 to 1:1, in particular in the range from 1:0.5 to 1:0.8. The polyalkyleneimine preferably has a weight-average molecular weight in the range from 500 g/mol to 50000 g/mol, in particular from 550 g/mol to 2000 g/mol. The N atoms in the polyalkyleneimine are preferably separated from one another by alkylene groups having 2 to 12 C atoms, in particular 2 to 6 C atoms, although it is not necessary for all the alkylene groups to have the same number of C atoms. Ethylene groups, 1,2-propylene groups, 1,3-propylene groups and mixtures thereof are particularly preferred. The primary amino functions in the polyalkyleneimine can carry 1 or 2 polyalkoxy groups and the secondary amino functions can carry 1 polyalkoxy group, not every amino function having to be alkoxy group-substituted. The average number of alkoxy groups per primary and secondary amino function in the polyalkoxylated polyalkylenimine is preferably 5 to 100, in particular 10 to 50. The alkoxy groups in the polyalkoxylated polyalkyleneimine are preferably ethoxy, propoxy or butoxy groups or mixtures thereof. Polyethoxylated polyethyleneimines are particularly preferred. The polyalkoxylated polyalkyleneimines are obtainable by reacting the polyalkyleneimines with epoxides corresponding to the alkoxy groups. If desired, the terminal OH function of at least some of the polyalkoxy substituents can be replaced by an alkyl ether function having 1 to 10, in particular 1 to 3, C atoms.

Preferred detergent preparations are preferably free of copolymers having hydrophobic side chains, in particular free of hydrophobically modified polyacrylates.

Preferred detergent preparations are free of lauryl methacrylate copolymers, in particular free of copolymers of acrylic acid with lauryl methacrylate.

As a further optional component, a preferred detergent preparation comprises 0.2 to 4 wt. %, preferably 0.5 to 3 wt. %, fragrance preparation.

In addition to the actual fragrances, the fragrance preparation comprises solvents, solid carrier materials or stabilizers, for example.

A fragrance is a chemical substance that stimulates the sense of smell. In order to be able to stimulate the sense of smell, the chemical substance should be able to be distributed in the air, at least in part, i.e., the fragrance should be volatile at 25° C., at least to a small degree. If the fragrance is very volatile, the odor intensity then decreases rapidly again. In the case of a lower volatility, however, the odor impression is more sustainable, i.e., it does not disappear as quickly. In one embodiment, the fragrance therefore has a melting point which is in the range from −100° C. to 100° C., preferably from −80° C. to 80° C., more preferably from −20° C. to 50° C., in particular from −30° C. to 20° C. In a further embodiment, the fragrance has a boiling point in the range from 25° C. to 400° C., preferably from 50° C. to 380° C., more preferably from 75° C. to 350° C., in particular from 100° C. to 330° C.

Overall, a chemical substance should not exceed a particular molecular mass in order to act as a fragrance, since the required volatility can no longer be ensured at too high a molecular mass. In one embodiment, the fragrance has a molecular mass of 40 to 700 g/mol, more preferably of 60 to 400 g/mol.

The odor of a fragrance is perceived as pleasant by most people, and frequently corresponds to the odor of, for example, flowers, fruits, spices, bark, resin, leaves, grasses, mosses and roots. Thus, fragrances can also be used to mask unpleasant odors or else to provide a non-smelling substance with a desired odor. Individual fragrance compounds, for example the synthetic products of the ester, ether, aldehyde, ketone, alcohol and hydrocarbon types, can be used as fragrances.

Preferably, mixtures of different fragrances are used, which together produce an attractive fragrance note. Such a mixture of fragrances can also be referred to as perfume or perfume oil. Perfume oils of this kind can also contain natural fragrance mixtures, as are obtainable from plant sources.

For the lengthening of the fragrance effect, it has proven advantageous to encapsulate the fragrance. In a corresponding embodiment, at least a portion of the fragrance is used in encapsulated form (fragrance capsules), in particular in microcapsules. However, the entire fragrance can also be used in encapsulated form. The microcapsules may be water-soluble and/or water-insoluble microcapsules. For example, melamine-urea-formaldehyde microcapsules, melamine-formaldehyde microcapsules, urea-formaldehyde microcapsules or starch microcapsules can be used. "Fragrance precursor" refers to compounds which release the actual fragrance only after chemical conversion/cleavage, typically by the action of light or other ambient conditions, such as pH, temperature, etc. Such compounds are often also referred to as "pro-fragrances".

The composition of some preferred flowable detergent preparations can be found in the following tables (information in wt. % based on the total weight of the preparation, unless otherwise indicated). The detergent preparations are particularly preferably packaged as detergent portion units in which the detergent preparation is completely enclosed by a water-soluble film. The detergent preparations are preferably free of copolymers having hydrophobic side chains, in particular free of copolymers of acrylic acid with lauryl methacrylate.

| | Formula 1 | Formula 2 | Formula 3 | Formula 4 |
|---|---|---|---|---|
| Ethanol and 1,2-propanediol and glycerol [1)] | 5 to 25 | 10 to 22 | 10 to 22 | 15 to 20 |
| Surfactant | 35 to 55 | 35 to 55 | 40 to 50 | 40 to 50 |
| Water | 5 to 20 | 5 to 20 | 7 to 15 | 7 to 15 |
| Misc | up to 100 | up to 100 | up to 100 | up to 100 |

| | Formula 6 | Formula 7 | Formula 8 | Formula 9 |
|---|---|---|---|---|
| Ethanol and 1,2-propanediol and glycerol [1)] | 5 to 25 | 10 to 22 | 10 to 22 | 15 to 20 |
| Surfactant | 35 to 55 | 35 to 55 | 40 to 50 | 40 to 50 |
| Fatty acid | 4 to 12 | 4 to 12 | 4 to 12 | 6 to 10 |
| Water | 5 to 20 | 5 to 20 | 7 to 15 | 7 to 15 |
| Misc | up to 100 | up to 100 | up to 100 | up to 100 |

| | Formula 11 | Formula 12 | Formula 13 | Formula 14 |
|---|---|---|---|---|
| Ethanol and 1,2-propanediol and glycerol [1)] | 5 to 25 | 10 to 22 | 10 to 22 | 15 to 20 |
| Surfactant | 35 to 55 | 35 to 55 | 40 to 50 | 40 to 50 |
| Enzyme preparation | 0.2 to 5 | 0.2 to 5 | 0.2 to 5 | 0.5 to 4 |
| Water | 5 to 20 | 5 to 20 | 7 to 15 | 7 to 15 |
| Misc | up to 100 | up to 100 | up to 100 | up to 100 |

| | Formula 16 | Formula 17 | Formula 18 | Formula 19 |
|---|---|---|---|---|
| Ethanol and 1,2-propanediol and glycerol [1)] | 5 to 25 | 10 to 22 | 10 to 22 | 15 to 20 |
| Surfactant | 35 to 55 | 35 to 55 | 40 to 50 | 40 to 50 |
| Fatty acid | 4 to 12 | 4 to 12 | 4 to 12 | 6 to 10 |
| Enzyme preparation | 0.2 to 5 | 0.2 to 5 | 0.2 to 5 | 0.5 to 4 |
| Water | 5 to 20 | 5 to 20 | 7 to 15 | 7 to 15 |
| Misc | up to 100 | up to 100 | up to 100 | up to 100 |

| | Formula 21 | Formula 22 | Formula 23 | Formula 24 |
|---|---|---|---|---|
| Ethanol and 1,2-propanediol and glycerol [1)] | 5 to 25 | 10 to 22 | 10 to 22 | 15 to 20 |
| Surfactant | 35 to 55 | 35 to 55 | 40 to 50 | 40 to 50 |
| Fatty acid | 4 to 12 | 4 to 12 | 4 to 12 | 6 to 10 |
| Enzyme preparation | 0.2 to 5 | 0.2 to 5 | 0.2 to 5 | 0.5 to 4 |
| Phosphonate | 0.1 to 3 | 0.1 to 3 | 0.1 to 3 | 0.2 to 1 |
| Water | 5 to 20 | 5 to 20 | 7 to 15 | 7 to 15 |
| Misc | up to 100 | up to 100 | up to 100 | up to 100 |

| | Formula 26 | Formula 27 | Formula 28 | Formula 29 |
|---|---|---|---|---|
| Ethanol and 1,2-propanediol and glycerol [1)] | 5 to 25 | 10 to 22 | 10 to 22 | 15 to 20 |
| Surfactant | 35 to 55 | 35 to 55 | 40 to 50 | 40 to 50 |
| Fatty acid | 4 to 12 | 4 to 12 | 4 to 12 | 6 to 10 |
| Enzyme preparation | 0.2 to 5 | 0.2 to 5 | 0.2 to 5 | 0.5 to 4 |
| Phosphonate | 0.1 to 3 | 0.1 to 3 | 0.1 to 3 | 0.2 to 1 |
| Polyalkoxylated polyalkyleneimine [2)] | 0.5 to 10 | 0.5 to 10 | 2 to 8 | 2 to 8 |
| Water | 5 to 20 | 5 to 20 | 7 to 15 | 7 to 15 |
| Misc | up to 100 | up to 100 | up to 100 | up to 100 |

| | Formula 31 | Formula 32 | Formula 33 | Formula 34 |
|---|---|---|---|---|
| Ethanol and 1,2-propanediol and glycerol [1)] | 5 to 25 | 10 to 22 | 10 to 22 | 15 to 20 |
| Anionic surfactant | 12 to 30 | 15 to 28 | 15 to 28 | 18 to 26 |
| Non-ionic surfactant | 12 to 30 | 15 to 28 | 15 to 28 | 18 to 26 |
| Water | 5 to 20 | 5 to 20 | 7 to 15 | 7 to 15 |
| Misc | up to 100 | up to 100 | up to 100 | up to 100 |

| | Formula 36 | Formula 37 | Formula 38 | Formula 39 |
|---|---|---|---|---|
| Ethanol and 1,2-propanediol and glycerol [1)] | 5 to 25 | 10 to 22 | 10 to 22 | 15 to 20 |
| Anionic surfactant | 12 to 30 | 15 to 28 | 15 to 28 | 18 to 26 |
| Non-ionic surfactant | 12 to 30 | 15 to 28 | 15 to 28 | 18 to 26 |
| Fatty acid | 4 to 12 | 4 to 12 | 4 to 12 | 6 to 10 |
| Water | 5 to 20 | 5 to 20 | 7 to 15 | 7 to 15 |
| Misc | up to 100 | up to 100 | up to 100 | up to 100 |

| | Formula 41 | Formula 42 | Formula 43 | Formula 44 |
|---|---|---|---|---|
| Ethanol and 1,2-propanediol and glycerol [1)] | 5 to 25 | 10 to 22 | 10 to 22 | 15 to 20 |
| Anionic surfactant | 12 to 30 | 15 to 28 | 15 to 28 | 18 to 26 |
| Non-ionic surfactant | 12 to 30 | 15 to 28 | 15 to 28 | 18 to 26 |
| Enzyme preparation | 0.2 to 5 | 0.2 to 5 | 0.2 to 5 | 0.5 to 4 |
| Water | 5 to 20 | 5 to 20 | 7 to 15 | 7 to 15 |
| Misc | up to 100 | up to 100 | up to 100 | up to 100 |

| | Formula 46 | Formula 47 | Formula 48 | Formula 49 |
|---|---|---|---|---|
| Ethanol and 1,2-propanediol and glycerol [1)] | 5 to 25 | 10 to 22 | 10 to 22 | 15 to 20 |
| Anionic surfactant | 12 to 30 | 15 to 28 | 15 to 28 | 18 to 26 |
| Non-ionic surfactant | 12 to 30 | 15 to 28 | 15 to 28 | 18 to 26 |
| Fatty acid | 4 to 12 | 4 to 12 | 4 to 12 | 6 to 10 |
| Enzyme preparation | 0.2 to 5 | 0.2 to 5 | 0.2 to 5 | 0.5 to 4 |
| Water | 5 to 20 | 5 to 20 | 7 to 15 | 7 to 15 |
| Misc | up to 100 | up to 100 | up to 100 | up to 100 |

| | Formula 51 | Formula 52 | Formula 53 | Formula 54 |
|---|---|---|---|---|
| Ethanol and 1,2-propanediol and glycerol [1)] | 5 to 25 | 10 to 22 | 10 to 22 | 15 to 20 |
| Anionic surfactant | 12 to 30 | 15 to 28 | 15 to 28 | 18 to 26 |
| Non-ionic surfactant | 12 to 30 | 15 to 28 | 15 to 28 | 18 to 26 |
| Fatty acid | 4 to 12 | 4 to 12 | 4 to 12 | 6 to 10 |
| Enzyme preparation | 0.2 to 5 | 0.2 to 5 | 0.2 to 5 | 0.5 to 4 |

-continued

| | Formula 51 | Formula 52 | Formula 53 | Formula 54 |
|---|---|---|---|---|
| Phosphonate | 0.1 to 3 | 0.1 to 3 | 0.1 to 3 | 0.2 to 1 |
| Water | 5 to 20 | 5 to 20 | 7 to 15 | 7 to 15 |
| Misc | up to 100 | up to 100 | up to 100 | up to 100 |

| | Formula 56 | Formula 57 | Formula 58 | Formula 59 |
|---|---|---|---|---|
| Ethanol and 1,2-propanediol and glycerol [1)] | 5 to 25 | 10 to 22 | 10 to 22 | 15 to 20 |
| Anionic surfactant | 12 to 30 | 15 to 28 | 15 to 28 | 18 to 26 |
| Non-ionic surfactant | 12 to 30 | 15 to 28 | 15 to 28 | 18 to 26 |
| Fatty acid | 4 to 12 | 4 to 12 | 4 to 12 | 6 to 10 |
| Enzyme preparation | 0.2 to 5 | 0.2 to 5 | 0.2 to 5 | 0.5 to 4 |
| Phosphonate | 0.1 to 3 | 0.1 to 3 | 0.1 to 3 | 0.2 to 1 |
| Polyalkoxylated polyalkyleneimine [2)] | 0.5 to 10 | 0.5 to 10 | 2 to 8 | 2 to 8 |
| Water | 5 to 20 | 5 to 20 | 7 to 15 | 7 to 15 |
| Misc | up to 100 | up to 100 | up to 100 | up to 100 |

1) Mixture comprising ethanol and 1,2-propanediol and glycerol, wherein the weight ratio of ethanol and 1,2-propanediol to glycerol is between 0.9 and 5.0, preferably from 1.5 to 3.5 and in particular from 2 to 3.

2) Polyalkoxylated polyalkyleneimine obtainable by reacting polyalkyleneimines with alkylene oxides.

The previously described material systems are not only suitable for ensuring simple producibility, a good storage life and cleaning performance, but also enable the realization of product optics which are attractive to the consumer. For example, detergent preparations which are transparent and consequently have low turbidity are perceived as optically attractive. Preferred detergent preparations therefore have a turbidity (HACH Turbidimeter 2100Q, 20° C., 10 ml cuvette) below 100 NTU, preferably below 50 NTU, and in particular below 20 NTU. In the case of an NTU value (at 20° C.) of 60 or more, molded bodies exhibit a perceptible turbidity, within the meaning of the invention, identifiable by the naked eye.

The optical advantages of the concentrated detergent preparations come to bear in particular in packaging, which is in turn transparent and enables a direct view of the detergent composition. In addition to transparent plastic bottles, transparent bags, in particular water-soluble transparent bags, are therefore preferred for manufacturing and packaging.

A further preferred subject of this application is therefore a detergent portion unit comprising i) a detergent preparation according to the invention ii) a water-soluble film which completely surrounds the detergent preparation.

The water-soluble film in which the detergent preparation is packaged can comprise one or more structurally different water-soluble polymer(s). Suitable water-soluble polymer(s) are in particular polymers from the group of (optionally acetalized) polyvinyl alcohols (PVAL) and copolymers thereof.

Water-soluble films are preferably based on a polyvinyl alcohol or a polyvinyl alcohol copolymer of which the molecular weight is in the range of from 10,000 to 1,000,000 $gmol^{-1}$, preferably from 20,000 to 500,000 $gmol^{-1}$, particularly preferably from 30,000 to 100,000 $gmol^{-1}$, and in particular from 40,000 to 80,000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis of 70 to 100 mol. %, preferably 80 to 90 mol. %, particularly preferably 81 to 89 mol. %, and in particular 82 to 88 mol. %.

Preferred polyvinyl alcohol copolymers include, in addition to vinyl alcohol, an ethylenically unsaturated carboxylic acid, or the salt or ester thereof. In addition to vinyl alcohol, such polyvinyl alcohol copolymers particularly preferably contain sulfonic acids, such as 2-acrylamido-2-methyl-1-propanesulfonic acid (AMPS), acrylic acid, methacrylic acid, acrylic esters, methacrylic esters or mixtures thereof; among the esters, preference is given to $C_{1-4}$ alkyl ester or hydroxyalkyl esters. Ethylenically unsaturated dicarboxylic acids, for example itaconic acid, maleic acid, fumaric acid and mixtures thereof, are possible as further monomers.

Suitable water-soluble films for use are marketed, inter alia, by the company MonoSol LLC, for example under the name M8630, M8720, M8310, C8400 or M8900. For example, films with the name Solublon® PT, Solublon® GA, Solublon® KC or Solublon® KL by Aicello Chemical Europe GmbH or the VF-HP films by Kuraray are also suitable.

The water-soluble films can contain additional active ingredients or fillers, but also plasticizers and/or solvents, in particular water, as further ingredients.

In this case, the group of the further active ingredients includes, for example, materials which protect the ingredients of the preparation which are surrounded by the film material, from decomposition or deactivation by light irradiation. Antioxidants, UV absorbers and fluorescent dyes have proven to be particularly suitable here.

As plasticizers, it is possible to use, for example, glycerol, ethylene glycol, diethylene glycol, propanediol, 2-methyl-1,3-propanediol, sorbitol or mixtures thereof.

To reduce the coefficients of friction thereof, the surface of the water-soluble film of the detergent portion unit can optionally be powder-coated with fine powder. Sodium aluminosilicate, silicon dioxide, talc and amylose are examples of suitable powdering agents.

Preferred water-soluble films are suitable for processing in a deep-drawing apparatus.

The volume of the detergent portion unit is preferably from 12 to 22 ml, in particular from 12 to 18 ml.

Preferred detergent portion units have one to four receiving chambers, preferably three or four receiving chambers. In the case of detergent portion units having two or more receiving chambers, preferably at least one of the receiving chambers, preferably the majority of the receiving chambers, is transparent.

A further subject of the application is a method for cleaning textiles, in which a previously described detergent preparation or detergent portion unit is introduced into the washing liquor of a textile washing machine.

In preferred method variants, the detergent preparation or the detergent portion unit is metered directly into the drum or into the detergent drawer of the textile washing machine.

The machine textile washing process is preferably carried out at temperatures of 20° C. to 60° C., preferably of 30° C. to 45° C.

This application provides, inter alia, the following subjects:

1. Flowable detergent preparation containing, based on the total weight thereof,
   a) ethanol and 1,2-propanediol and glycerol in a total amount of 5 to 25 wt. %; wherein the weight ratio of ethanol and 1,2-propanediol to glycerol is between 0.9 and 5.0.
2. Detergent preparation according to point 1, wherein the detergent preparation contains, based on the total weight thereof, 0.2 to 5 wt. %, preferably 0.5 to 4 wt. %, enzyme preparation.
3. Detergent preparation according to either of the preceding points, wherein the detergent preparation also contains at least one enzyme preparation, preferably at least 3 enzyme preparations of enzymes from the group of amylase, protease, cellulase, preparations of a pectinolytic enzyme, and endoglucanase.
4. Detergent preparation according to any of the preceding points, wherein the detergent preparation contains, based on the total weight thereof, 0.1 to 2 wt. %, preferably 0.2 to 1 wt. %, of an amylase preparation.
5. Detergent preparation according to any of the preceding points, wherein the detergent preparation contains, based on the total weight thereof, 0.2 to 3 wt. %, preferably 0.4 to 2 wt. %, of a protease preparation.
6. Detergent preparation according to any of the preceding points, wherein the detergent preparation contains, based on the total weight thereof, 0.01 to 1 wt. %, preferably 0.02 to 0.3 wt. %, of a mannanase preparation.
7. Detergent preparation according to any of the preceding points, wherein the detergent preparation contains, based on the total weight thereof, 0.01 to 1 wt. %, preferably 0.05 to 0.3 wt. %, of a cellulase preparation.
8. Detergent preparation according to any of the preceding points, wherein the enzyme preparations, based on the total weight thereof, have a proportion by weight of active protein of 0.1 to 40 wt. %, preferably 0.2 to 30 wt. %.
9. Detergent preparation according to any of the preceding points, wherein the detergent preparation contains, based on the total weight thereof, ethanol and 1,2-propanediol and glycerol in a total amount of 10 to 22 wt. %, preferably 15 to 20 wt. %.
10. Detergent preparation according to any of the preceding points, wherein the weight ratio of ethanol and 1,2-propanediol to glycerol is from 1.5 to 3.5, preferably from 2 to 3.
11. Detergent preparation according to any of the preceding points, wherein the detergent preparation contains less than 2 wt. %, preferably less than 1 wt. %, and in particular no, further organic solvent, besides ethanol, 1,2-propanediol and glycerol.
12. Detergent preparation according to any of the preceding points, wherein the detergent preparation contains, based on the total weight thereof, 5 to 20 wt. %, preferably 7 to 15 wt. %, water.
13. Detergent preparation according to any of the preceding points, wherein the detergent preparation contains, based on the total weight thereof, 35 to 55 wt. %, preferably 40 to 50 wt. %, surfactant.
14. Detergent preparation according to any of the preceding points, wherein the detergent preparation contains surfactant from the group of the anionic and non-ionic surfactants.
15. Detergent preparation according to any of the preceding points, wherein the detergent preparation contains 12 to 30 wt. %, preferably 15 to 28 wt. %, and in particular 18 to 26 wt. %, anionic surfactant from the group of $_{8-18}$ alkylbenzenesulfonates.

16. Detergent preparation according to point 15, wherein the $C_{8-18}$ alkylbenzene sulfonate has the formula (I),

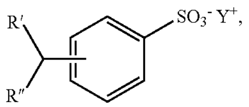

(I)

where R' and R" are, independently of one another, H or alkyl, and together contain 8 to 18, preferably 9 to 15 and in particular 9 to 13, C atoms, and $Y^+$ denotes a monovalent cation or the nth part of an n-valent cation, in particular monoethanolamine.

17. Detergent preparation according to any of the preceding points, wherein the detergent preparation contains, based on the total weight thereof, 4 to 12 wt. %, preferably 6 to 10 wt. %, fatty acid.

18. Detergent preparation according to any of the preceding points wherein the detergent preparation contains fatty acid selected from the group of caprylic acid, capric acid, lauric acid, myristic acid, palmitic acid, stearic acid, oleic acid, linoleic acid and mixtures thereof.

19. Detergent preparation according to any of the preceding points, wherein the detergent preparation contains, based on the total weight thereof, 12 to 30 wt. %, preferably 15 to 28 wt. % and in particular 18 to 26 wt. %, non-ionic surfactant.

20. Detergent preparation according to any of the preceding points, wherein the detergent preparation contains non-ionic surfactant from the group of the ethoxylated primary $C_{8-18}$ alcohols, preferably the ethoxylated primary $C_{8-18}$ alcohols having a degree of alkoxylation ≥4, particularly preferably the $C_{12-14}$ alcohols having 4 EO or 7 EO, the $C_{9-11}$ alcohols having 7 EO, the $C_{13-15}$ alcohols having 5 EO, 7 EO or 8 EO, the $C_{13-15}$ oxo alcohols having 7 EO, the $C_{12-18}$ alcohols having 5 EO or 7 EO, in particular the $C_{12-18}$ fatty alcohols having 7 EO or the $C_{13-15}$ oxo alcohols having 7 EO.

21. Detergent preparation according to any of the preceding points, wherein the detergent preparation contains non-ionic surfactant and anionic surfactant in a weight ratio of from 2:1 to 1:2, preferably from 3:2 to 2:3.

22. Detergent preparation according to any of the preceding points, wherein the detergent preparation contains, based on the total weight thereof, 0.1 to 3 wt. %, preferably 0.2 to 1 wt. %, phosphonate.

23. Detergent preparation according to any of the preceding points, wherein the detergent preparation contains phosphonate and the phosphonate is selected from the group of hydroxyalkane phosphonates and/or aminoalkane phosphonates, preferably from the group of aminoalkane phosphonates and in particular from the group of ethylenediamine tetramethylene phosphonate (EDTMP) and diethylenetriamine pentamethylene phosphonate (DTPMP).

24. Detergent preparation according to any of the preceding points, wherein the detergent preparation, based on the total weight thereof, contains 0.5 to 10 wt. %, preferably 2 to 8 wt. %, polyalkoxylated polyalkyleneimine, which is obtainable by reacting polyalkyleneimines with alkyl ene oxides, preferably a polyethoxylated polyethyleneimine.

25. Detergent preparation according to any of the preceding points, wherein the detergent preparation is free of copolymers having hydrophobic side chains, in particular free of hydrophobically modified polyacrylates.

26. Detergent preparation according to any of the preceding points, wherein the detergent preparation is free of lauryl methacrylate copolymers, in particular free of copolymers of acrylic acid with lauryl methacrylate.

27. Detergent preparation according to any of the preceding points, wherein the detergent preparation contains, based on the total weight thereof, 0.2 to 4 wt. %, preferably 0.5 to 3 wt. %, fragrance preparation.

28. Detergent portion unit comprising
   i) a detergent preparation according to any of points 1 to 27
   ii) a water-soluble film which completely surrounds the detergent preparation.

29. Detergent portion unit according to point 28, wherein the detergent portion unit has a volume of 12 to 22 ml, preferably 12 to 18 ml.

30. Detergent portion unit according to either point 28 or point 29, wherein the detergent portion unit has one to four receiving chambers, preferably three or four receiving chambers.

31. Method for textile cleaning, in which a detergent preparation according to any of points 1 to 27 or a detergent portion unit according to any of points 28 to 30 is introduced into the washing liquor of a textile washing machine.

EXAMPLES

The liquid detergents listed in the tables below were stored at temperatures of 0° C., 23° C. and 40° C. for two weeks. After storage, the samples were tempered for six hours at ambient temperature (20° C.) and underwent an optical test. The evaluation of the product optics (counter light) was carried out by means of a scale of 1 to 5, in which 1 stands for inadequate product optics (turbidity, phase separation) and 5 stands for very good product optics (clear product).

TABLE 1

| Detergent composition (wt. %) | | | |
|---|---|---|---|
| | V1 | E1 | V2 |
| Ethanol | 3.1 | 9.9 | 5.5 |
| 1,2-propanediol | 5.5 | 3.1 | 9.9 |
| Glycerol | 9.9 | 5.5 | 3.1 |
| Water | 9.0 | 9.0 | 9.0 |
| Monoethanolamine | 6.0 | 6.0 | 6.0 |
| C12-18 fatty alcohol ethoxylate, 7 EO | 23 | 23 | 23 |
| C10-13 alkylbenzene sulfonic acid | 23 | 23 | 23 |
| C12-18 fatty acid | 7.0 | 7.0 | 7.0 |
| DTPMP (40% in water) | 1.7 | 1.7 | 1.7 |
| Optical brightener | 0.6 | 0.6 | 0.6 |
| Protease | 2.5 | 2.5 | 2.5 |
| Mannanase | 0.1 | 0.1 | 0.1 |
| Amylase | 0.4 | 0.4 | 0.4 |
| Cellulase | 0.15 | 0.15 | 0.15 |
| Misc | up to 100 | up to 100 | up to 100 |

TABLE 2

| Detergent composition (wt. %) | | | | | |
|---|---|---|---|---|---|
| | Ratio ethanol + 1,2-propanediol/glycerol | Storage temperature 0° C. | 23° C. | 40° C. | Average |
| V1 | 0.9 | 4 | 5 | 4 | 4.3 |
| E1 | 2.4 | 5 | 5 | 4 | 4.7 |
| V2 | 5.0 | 1 | 3 | 4 | 2.7 |

What is claimed is:

1. A flowable detergent preparation comprising, based on the total weight of the flowable detergent preparation:

a) from 15 wt. % to 20 wt. % of an organic solvent mixture of ethanol, 1,2-propanediol, and glycerol, wherein the weight ratio of the ethanol and 1,2-propanediol to the glycerol is from 0.9 to 2.5, and the flowable detergent preparation does not further comprise an additional organic solvent;

b) monoethanolamine; and c) from 6 wt. % to 10 wt. % fatty acid.

2. The flowable detergent preparation of claim 1, further comprising, based on the total weight of the flowable detergent preparation, from 0.2 to 5 wt. % of an enzyme preparation.

3. The flowable detergent preparation of claim 1, wherein the weight ratio of the ethanol and 1,2-propanediol to the glycerol is from 1.5 to 2.5.

4. The flowable detergent preparation of claim 1, further comprising, based on the total weight the flowable detergent preparation, from 5 to 20 wt. % of water.

5. The flowable detergent preparation of claim 1, further comprising, based on the total weight the flowable detergent preparation, from 35 to 55 wt. % of a surfactant.

6. The flowable detergent preparation of claim 1, further comprising a non-ionic surfactant and an anionic surfactant in a weight ratio of from 2:1 to 1:2.

7. A detergent unit portion comprising:

i) the flowable detergent preparation of claim 1; and ii) a water-soluble film which completely surrounds the flowable detergent preparation.

8. A method for cleaning textiles, the method comprising introducing the flowable detergent preparation of claim 1 into a washing liquor of a textile washing machine.

9. The flowable detergent preparation of claim 2, wherein the flowable detergent preparation comprises, based on the total weight of the flowable detergent preparation, from 0.5 to 4 wt. % of the enzyme preparation.

10. The flowable detergent preparation of claim 3, wherein the weight ratio of the ethanol and 1,2-propanediol to the glycerol is from 2 to 2.5.

11. The flowable detergent preparation of claim 4, wherein the flowable detergent preparation comprises, based on the total weight of the flowable detergent preparation, from 7 to 15 wt. % of water.

12. The flowable detergent preparation of claim 5, wherein the flowable detergent preparation comprises, based on the total weight of the flowable detergent preparation, from 40 to 50 wt. % of the surfactant.

13. The flowable detergent preparation of claim 6, wherein the flowable detergent preparation comprises the non-ionic surfactant and the anionic surfactant in a weight ratio of from 3:2 to 2:3.

14. A method for cleaning textiles, the method comprising introducing the detergent unit portion of claim 7 into a washing liquor of a textile washing machine.

15. The flowable detergent preparation of claim 1, further comprising, based on the total weight of the flowable detergent preparation, from 15 to 28 wt. % of an anionic surfactant.

16. The flowable detergent preparation of claim 15, wherein the anionic surfactant is a $C_{8-18}$ alkylbenzene sulfonate.

17. The flowable detergent preparation of claim 16, wherein the $C_{8-18}$ alkylbenzene sulfonate has the formula of Formula (I):

Formula (I)

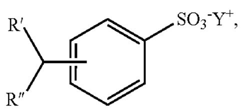

wherein R' and R", independently of one another, are selected from the group consisting of H and an alkyl, wherein R' and R" together comprise 8 to 19 C atoms, and wherein $Y^+$ is selected from the group consisting of a monovalent cation and the nth part of a n-valent cation.

18. The flowable detergent preparation of claim 17, wherein the $Y^+$ is monoethanolamine.

19. The flowable detergent preparation of claim 1, wherein the fatty acid is selected from the group consisting of caprylic acid, capric acid, lauric acid, myristic acid, palmitic acid, stearic acid, oleic acid, linoleic acid, and any combination thereof.

20. The flowable detergent preparation of claim 1, wherein the flowable detergent preparation has a turbidity below 100 NTU as measured by a HACH Turbidimeter 2100Q at 20° C. in a 10 ml cuvette.

* * * * *